United States Patent [19]

Page et al.

[11] Patent Number: 4,706,706

[45] Date of Patent: Nov. 17, 1987

[54] CHECK VALVE AND A SEAL FOR A CHECK VALVE

[75] Inventors: Robert G. Page, Farnham; John S. Milton, Guildford, both of England

[73] Assignee: Corrotex Limited, Surrey, England

[21] Appl. No.: 887,044

[22] PCT Filed: Nov. 19, 1985

[86] PCT No.: PCT/GB85/00527

§ 371 Date: Jul. 18, 1986

§ 102(e) Date: Jul. 18, 1986

[87] PCT Pub. No.: WO86/03273

PCT Pub. Date: Jun. 5, 1986

[30] Foreign Application Priority Data

Nov. 19, 1984 [GB] United Kingdom ............... 8429200

[51] Int. Cl.[4] ............... F16K 15/03; F16K 15/18; F16K 25/00
[52] U.S. Cl. ............... 137/527.8; 137/527; 251/82; 251/175; 251/284; 277/168
[58] Field of Search ............... 137/527, 527.2, 527.4, 137/527.6, 527.8; 251/175, 284, 82; 277/27, 168

[56] References Cited

U.S. PATENT DOCUMENTS

| | | | |
|---|---|---|---|
| 2,654,388 | 10/1953 | Glass | 137/527.8 X |
| 3,075,547 | 1/1963 | Scaramucci | 137/527.4 X |
| 3,228,651 | 1/1966 | Egashira | 251/122 |
| 3,514,076 | 12/1967 | Wheatley | 251/261 |
| 3,522,929 | 1/1968 | Simone | 251/298 |
| 3,658,293 | 4/1972 | Gaebel | 251/228 |
| 3,687,155 | 8/1972 | Wheatley | 137/527.8 X |
| 3,933,173 | 1/1976 | Kajita | 137/527.8 |
| 3,934,608 | 1/1976 | Guyton | 137/527.8 |
| 3,937,240 | 2/1976 | Nanny | 137/527.8 |
| 4,027,696 | 6/1977 | Guyton | 137/527.4 |
| 4,054,153 | 10/1977 | Guyton | 137/527 |
| 4,113,268 | 9/1978 | Simmons et al. | 277/168 |
| 4,120,318 | 10/1978 | Jourdan | 137/527.4 |
| 4,128,111 | 12/1978 | Hansen et al. | 137/527.8 X |
| 4,223,697 | 9/1980 | Pendleton | 137/527.8 |
| 4,230,150 | 10/1980 | Scaramucci | 137/527 |
| 4,249,568 | 2/1981 | Duggan | 137/527.8 X |
| 4,258,925 | 3/1981 | Guyton | 137/527 X |
| 4,281,680 | 8/1981 | Ripert | 137/527.4 |
| 4,282,896 | 8/1981 | Makino | 137/495 |
| 4,410,007 | 10/1983 | Karpenko | 137/527.8 X |
| 4,469,122 | 9/1984 | Meek | 137/527.8 X |

FOREIGN PATENT DOCUMENTS

| | | |
|---|---|---|
| 0024213 | 2/1981 | European Pat. Off. . |
| 0039112 | 11/1981 | European Pat. Off. . |
| 0111716 | 6/1984 | European Pat. Off. . |
| 585379 | 10/1933 | Fed. Rep. of Germany . |
| 605157 | 11/1934 | Fed. Rep. of Germany . |
| 647978 | 7/1937 | Fed. Rep. of Germany . |
| 3330409 | 3/1985 | Fed. Rep. of Germany . |
| 811237 | 4/1959 | United Kingdom . |
| 988894 | 4/1965 | United Kingdom . |
| 1277713 | 6/1972 | United Kingdom . |
| 1397738 | 6/1975 | United Kingdom . |
| 1532002 | 11/1978 | United Kingdom . |
| 1544590 | 4/1979 | United Kingdom . |
| 2009368 | 6/1979 | United Kingdom . |
| 1577044 | 10/1980 | United Kingdom . |
| 2064721 | 6/1981 | United Kingdom . |

Primary Examiner—Alan Cohan
Assistant Examiner—John Rivell
Attorney, Agent, or Firm—Nixon & Vanderhye

[57] ABSTRACT

A horizontal check valve has a swinging clapper (16) eccentric with a tapered valve seat (14) and carrying a floating ring seal. There is clearance between the clapper (16) and the passage wall at the bottom so that reverse flow urges the ring seal into the taper. The clapper (16) abuts an abutment surface (15) formed by the valve body (10) around the valve seat so that the hydrostatic forces exerted on the clapper (16) by the reverse fluid flow are reacted by the abutment surface and not by the tapered seat (14).

8 Claims, 7 Drawing Figures

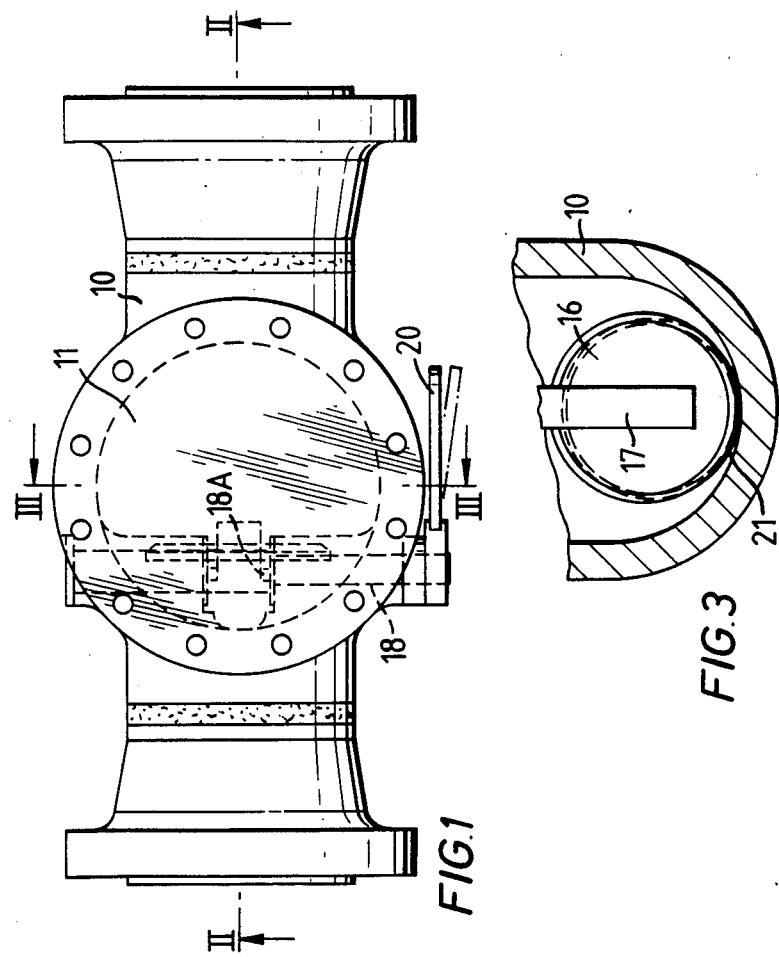

CHECK VALVE AND A SEAL FOR A CHECK VALVE

DESCRIPTION

This invention relates to check valves.

A check valve comprises a housing which forms a through passage which is to be connected into a fluid pipeline when the valve is in use. There is an annular valve seat which extends around the passage, and an obturating member which is cooperable with the valve seat to close the through passage and which is displaceable from the valve seat to allow fluid flow through the through passage.

U.S. Pat. No. 4,410,007 discloses a check valve comprising a housing which forms a through passage which is to be connected into a fluid pipeline when the valve is in use, the housing including an annular valve seat which extends around the passage and tapers towards the upstream end of the passage in the context of the normal direction of flow through the passage, and an obturating member cooperable with the valve seat to close the through passage and displaceable from the valve seat to allow fluid flow through the through passage, the obturating member carrying an annular seal which effects a metal to metal seal between the obturating member and the valve seat when the through passage is closed by the obturating member. In the context that it is difficult to make such metal to metal seals leak proof, a soft seal backup to the main metal to metal seal is provided and provision is made for reverse fluid flow to be conducted through the obturating member and applied to the soft seal so as to expand it into engagement with the valve seat to form a secondary seal so that flow through the check valve is prevented.

One aspect of this invention arises from our appreciation that the sealing forces that act between the annular seal and the valve seat would be increased if the angle of taper of the valve seat is reduced as compared with that of the tapered valve seat that is incorporated in the check valve disclosed in U.S. Pat. No. 4,410,007, and that the risk of jamming of the obturating member in the resultant tapered orifice could be avoided by arranging for the obturating member to make direct face to face contact with an abutment surface separate from the tapered surface of the valve seat so that the hydrostatic forces applied to the obturating member by the reverse fluid flow would be reacted by the abutment surface and not be the tapered surface of the valve seat.

Known forms of sub-sea check valve are either provided with a remotely-controllable actuator having an actuating element which is permanently coupled to the obturating member, the actuator being operable to positively seat the obturating member and to unseat it as required, or are arranged with the obturating member mounted for free pivotal movement within the housing such that it floats in normal fluid flow through the through passage in one direction and is thereby displaced from the valve seat, but is caused to seat on the valve seat by a tendency for fluid to flow through the through passage in the opposite direction whereby to close the through passage and inhibit such flow in that opposite direction. The former variety of sub-sea check valve has the advantage that the obturating member can be displaced from the through passage into an alcove in the housing by operation of the actuator so as to leave the through passage clear for passage through it of a device known as a pig which is for effecting any one of a number of functions such as cleaning the walls of the passage, removal of debris or measuring the inside diameter of the passage, but it does not close automatically in response to certain conditions, say any tendency for the direction of flow to reverse such as would occur in the event of a failure in the pipeline upstream of the check valve. The latter variety will close automatically but suffers from the disadvantages that at least part of the obturating member obstructs the path of a pig since it either floats in fluid flow through the pipe or seats on the valve seat due to the action of gravity.

Another object of this invention is to provide an improved from of check valve which is suitable for use as a sub-sea check valve.

According to another aspect of this invention there is provided a check valve comprising a housing which forms a through passage which is to be connected into a fluid pipeline when the valve is in use, an annular valve seat which extends around the passage, an obturating member cooperable with the valve seat to close the through passage and displaceable from the valve seat to allow fluid flow through the through passage, and a remotely controllable actuator which is operable to displace the obturating member from the through passage unobstructed, wherein an actuating element of the actuator is coupled to the obturating member by a buckling link which serves as a tie by which the obturating member is displaced into the alcove by operation of the actuator but which can buckle to allow free movement of the obturating member relative to the valve seat independently of the actuator when the latter is inoperative.

The obturating member may be pivotally mounted within the housing. Conveniently the obturating member is suspended from a closure member which is releasably secured to the valve body to close an aperture in the tope of the valve body. The valve seat may be mounted removably within the valve body at a location relative to said aperture such that it can be lifted from the valve body through the aperture when the closure member has been removed.

Preferably the check valve is a check valve according to said one aspect of this invention.

Another object of this invention is to provide an improved floating ring seal. Hence, according to another aspect of this invention, there is provided a floating ring seal comprising an annular peripheral portion which forms a shallow concave radially outer peripheral sealing surface having a greater outside diameter at one end than at the other, wherein the peripheral portion is formed at the radially outer edge of a radially convoluted annular portion. The radially convoluted annular portion maybe connected to the peripheral portion at said one end thereof. Conveniently the radially inner periphery of the convoluted annular portion is formed as a thickened rib.

Check valves in which this invention is embodied are described now by way of example with reference to the accompanying drawings, of which:-

FIG. 1 is a plan view of a check valve which is also a manually-operable stop or shut-off valve;

FIG. 3 is a sectioned fragment of the valve shown in FIG. 1, the section being on the line III—III in FIG. 1;

Figure 2:
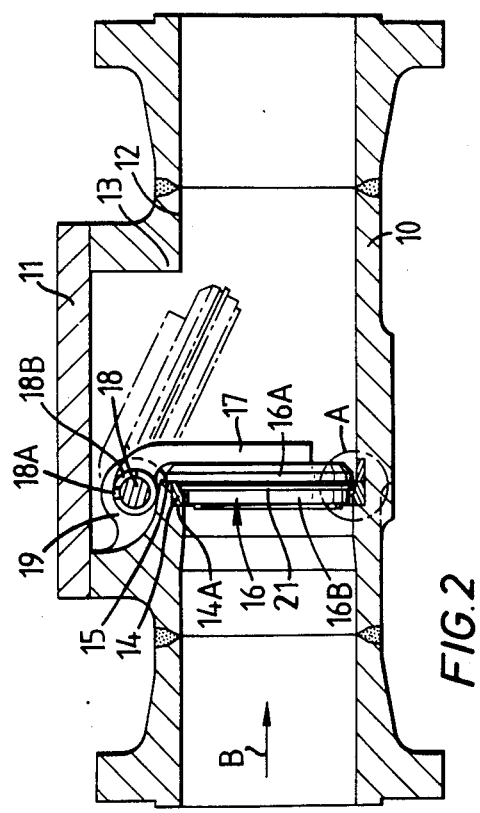
FIG. 2 is a transverse cross-section on the line II—II in FIG. 1 of the valve shown in FIG. 1 in the check valve mode, with the clapper shown seated, the open position of the clapper being shown chain-dotted.

FIGS. 1 and 2 show that the check valve comprises a housing formed by a valve body 10 and a bonnet 11 which is releasably secured to the body 10. A through bore 12 extends through the body 10 and forms a through passage for fluid flow. An aperture 13 which communicates with the through bore 12 is formed at the top of the valve body 10. The aperture 13 is closed by the bonnet 11 so as to form an alcove which is above the through bore 12 and in communication with it.

An annular metal valve seat 14 is mounted in the valve body 10 so as to extend circumferentially around the through bore 12. The valve seat 14 is located at the upstream end of the aperture 13 in the sense of the direction of normal fluid flow through the through passage 12 which is indicated by the arrow B. The upper part of the valve seat 14 is seated in a respective shoulder 14A which is formed in the valve body 10 at the upstream end of the aperture 13.

The lower part of the valve seat 14 is seated in a respective groove 14B. The valve seat 14 is seated in both the shoulder 14A and the groove 14B between the top and bottom around both sides of the through bore, the depths of the shoulder 14A and the groove 14B changing progressively around the bore 12 such that there is a gradual transition from the shoulder 14A at the top to the groove 14B at the bottom. The valve body 10 forms an abutment surface 15 at the top of, and around the remainder of the valve seat 14 that projects from the groove 14B down the sides of the through bore 12, the abutment surface 15 being substantially flush with the downstream face of the valve seat 14 (and thereby substantially normal to the axis of the through bore 12) and being crescent-shaped.

An obturating member, in the form of a clapper 16 fixed to a lever 17, cooperates with the valve seat 14 and the surrounding abutment surface 15 to close the through passage 12 when seated. The portion of the clapper 16 that is fixed to the lever 17 is a disc portion 16A which is eccentric to the valve seat 14 when the clapper 16 is seated, the centre of the disc portion 16A being displaced vertically upwards relative to the axis of the through bore 12. The remainder of the clapper 16 is a nose portion 16B which projects into the central aperture of the annular valve seat 14 with clearance therearound when the clapper 16 is seated, the nose portion 16B and the valve seat 14 being substantially concentric. Hence there is face to face contact between the disc portion 16A of the clapper 16 and the annular abutment surface 15 over a crescent shaped area at the top and down the sides but not at the bottom.

The lever 17 is cranked. It is fulcrummed on a hinge pin 18 which is journalled in a support 19. The latter is integral with the body 10. It is located within the alcove above the annular valve seat 14 and it has an aperture in it (see FIG. 1) through which the lever 17 projects, the aperture being shaped and sized to allow the lever 17 to swing the clapper 16 between its open and closed positions. The hinge pin 18 projects from the body 10 and has a handle 20 fitted to it at its outer end. Two axially aligned pegs 18A project radially from the hinge pin 18, each through a respective circumferentially extending slot 18B in the portion of the layer 17 that surrounds the hinge pin 18. The page 18A are movable from the upstanding location shown in FIG. 2, in which they permit swinging movement of the obturating member between the open and closed positions of the clapper 16, to a horizontal location in which they interact with the ends of the slots 18B to stop angular movement of the lever 17 and hold the clapper 16 closed. Such movement of the page 18A is effected by operation of the handle 20 to rotate the hinge pin 18 in the support 19.

Figure 4:
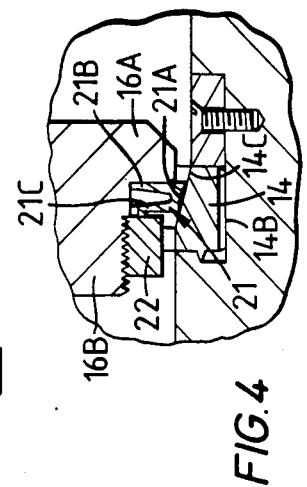
FIG. 4 is an enlarged view of detail A in FIG. 2.

FIG. 4 shows the detailed construction of the annular valve seat 14 at the bottom of the through bore 12 and of the cooperating part of the clapper 16 including a floating metal seal ring 21 which engages a tapered surface 14C of the seat 14 when the clapper 16 is seated. The tapered surface 14C tapers towards the upstream end of the through bore 12.

The floating seal ring 21 has a shallow concave radially outer peripheral surface 21A, and its outside diameter is greater at its downstream end than at its upstream end. It has a substantially U-shaped cross-section, the annular arms 21B and 21C of the U-section seal ring 21 extending radially inwardly into an annular cavity formed between the clapper disc portion 16A and a retaining nut 22 which is screwed onto the clapper nose portion 16B.

The dimensions of the clapper disc portion 16A, the floating seal ring 21 and the tapered surface 14C of the valve seat 14 are such that an interference fit is established between the seal ring 21 and the valve seat 14 when the clapper 16 is seated.

The check valve is inserted into a pipeline in use. Normal fluid flow is from the left to the right of FIG. 1 and 2, as shown by arrow B. The obturating member, comprising the clapper 16 and the lever 17, is freely pivotable relative to the rest of the structure when the handle 20 is set in its position for normal check valve operation. the pegs 18A being upstanding as shown in FIG. 2. The clapper 16 floats in the fluid and thus is displaced from the annular valve seat 14.

Should there be a reversal of the direction of fluid flow, the clapper 16 will swing down to seat with such reverse flow. Initial contact with the seat 14 will be by engagement of one of the edges of the concave outer surface 21A of the floating seal ring 21 with the tapered seat surface 14C but that will be followed instantaneously by face to face contact of the clapper disc portion 16A with the abutment surface 15 so that shock loads due to impact, etc., and the hydrostactic loading on the clapper 16 will be reacted directly by the body 10 and not applied to the floating ring seal 21.

As can be seen from FIG. 4, once the clapper 16 is seated, the clearance between the bottom of the clapper disc portion 16A on the one hand, and the valve seat 14 and the surface of the through bore 12 on the other hand provides access for the reverse fluid flow to the floating ring seal 21 so that that reverse fluid flow forces the seal 21 further into the seat taper. Travel of the seal 21 is limited by its abutment with the clapper 16 which in turn is restricted from travel by the abutment of its disc portion 16A with the abutment surface 15. Such reverse fluid flow will pass between the clapper disc portion 16A and the adjacent radial arm 21B of the floating seal ring 21 into the circumferentially extending cavity of that seal 21. Such fluid pressure in that cavity will act to urge the other radial arm 21C into fluid tight contact with the retaining nut 22 and also will urge the seal 21 both radially outwardly and axially into fluid tight contact with the tapered seat surface 14C. Hence fluid tight contact between the seal 21 and the valve seat 14 is established solely by the action of fluid pressure on the seal 21. It may be desirable to provide some elastomeric material in the cavity of the seal 21 in order to ensure a fluid tight seal between the seal 21 and the retaining unit 22.

The angle of taper of the tapered surface 14C should be as small as is practicable (say 10° to the axis of the through bore 12) so as to maximise the forces that urge the floating seat 21 into sealing engagement with the tapered surface 14C. However it should not be so small that there may be a risk that frictional forces acting between the floating seal 21 and the tapered surface 14C will not be overcome by the fluid pressure loading on the clapper 16 should there be a tendency for normal fluid flow to be reestablished in the direction of arrow B so that the valve fails to reopen to allow such flow.

In order to operate the valve as a block or shut off valve, the handle 20 is moved to its other position and that movement is transmitted to the clapper 16 through the hinge pin 18, the pegs 18A and the lever 17 so that the clapper 16 is seated, and held seated, regardless of in which direction fluid might be tending to flow through the through bore 12.

Arrangement of the clapper 16 for face to face contact with the crescent shaped abutment surface 15 which extends over the top and down the sides, but not at the bottom, leads to the seating loads being taken by the valve body 10 without significant risk of debris being trapped between the clapper 16 and the seat 14. Such debris will gravitate to the bottom of the through bore 12 and be pushed through the central aperture of the annular valve seat 14 by the clapper 16 as it closes rather than be trapped between the clapper and the seat. Provision of a tapered valve seat surface 14C which has as small an angle of taper as is practicable facilitates such movement of debris through the central aperture of the valve seat 14 since the surface of the through bore 12 is substantially smooth in the region of the valve seat 14, and the presence of pockets which could cause accumulation of debris is minimised.

Arrangement of the abutment surface 15 so that it is substantially normal to the axis of the through bore 12 avoids any risk that the clapper 16 will jam in its closed position due to any form of wedge action between it and the valve seat which has as small an angle of taper as is practicable. It is not, however, essential that the abutment surface be normal to the axis of the through bore 12, it too may be tapered relative to the axis of the through bore 12 providing that its angle of taper is sufficiently large to ensure that the clapper does not jam in face to face contact with it.

Nothing governs the location of clearance between the clapper on the one hand and the surface of the through bore and the tapered surface of the valve seat on the other if the valve is designed for use in a vertical pipeline. Any convenient arrangement of clapper which cooperates with an abutment surface which extends around at least part of the passage downstream of the valve seat and provides for access to the annular seal for reverse fluid flow when the passage is closed such that, once initial contact of the seal with the valve seat is established, fluid tight contact between the seal and the valve seat and the clapper is established solely by the action of fluid pressure on the seal, would be suitable for such an application.

Figure 5:
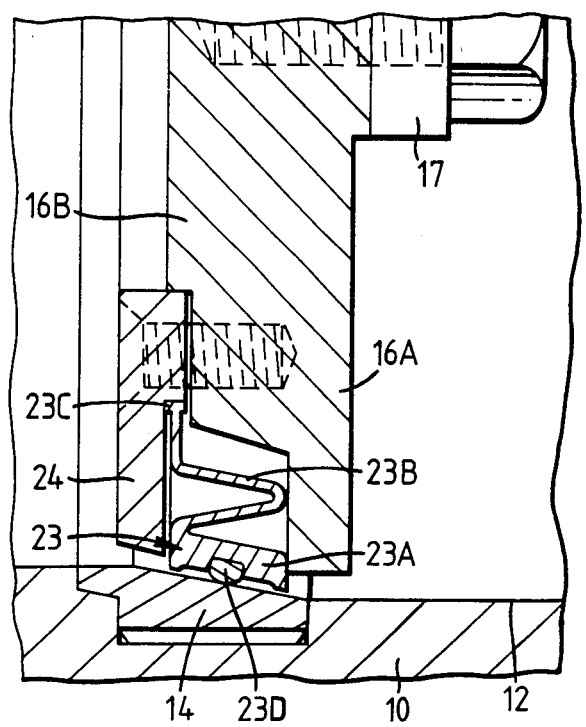
FIG. 5 is a view similar to FIG. 4 illustrating a different floating seal.

FIG. 5 shows part of a swinging check valve clapper similar to that of the valve shown in FIGS. 1 to 4 but modified to incorporate a different form of floating metal seal 23 instead of the U-section floating seal ring 21. The peripheral portion 23A of the seal 23 is similar to the peripheral portion of the floating seal ring 21 in that it forms a shallow concave radially outer peripheral surface having a greater outside diameter at its downstream end than at its upstream end. However that peripheral portion 23A is formed at the radially outer edge of a radially convoluted annular portion 23B which is connected to the peripheral portion 23 A at the upstream end thereof. The radially inner periphery 23C of the floating seal 23, which is formed at the radially inner edge of the convoluted portion 23B, is formed as a thickened annular rib and is trapped between the profiled clapper portion 16B and an annular retaining plate 24. A concentric ring 23D of low friction plastics material, such as an elastomer or a polyamide material is provided at the centre of the concave radially outer peripheral surface of the peripheral portion 23A.

The downstream edges of the peripheral portion 23A and of the convoluted portion 23B are in contact with the clapper disc portion 16A (as shown in FIG. 5) up until and when initial contact with the valve seat 14 is made by the seal 23, there being a clearance between the portions 23A and 23B and the retaining plate 24. Once the seal 23 has made contact with the seat 14, the reverse fluid pressure increases the force of contact therebetween by forcing the seal 23 further into the taper and up against the retaining plate 24.

Figure 6:
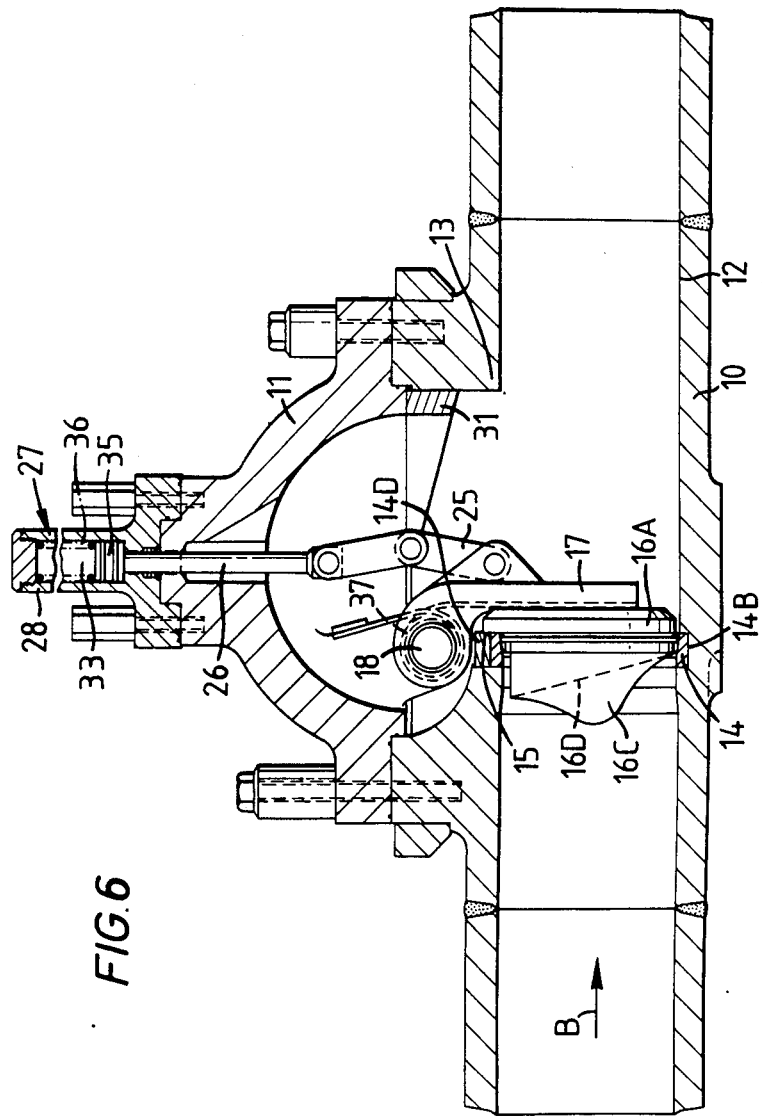
FIG. 6 is a transverse cross-section of a sub-sea check valve with the clapper shown seated.
Figure 7:
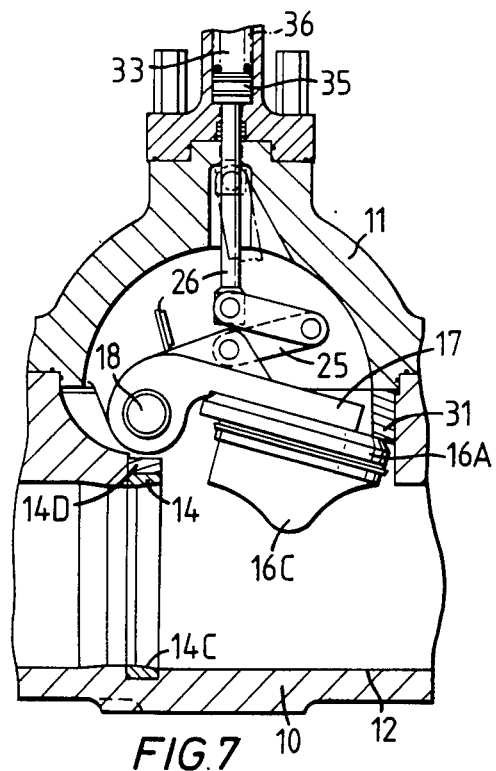
FIG. 7 is a fragmentary view, similar to a major portion of FIG. 6, but with the clapper unseated by fluid flow in the direction indicated by arrow B in FIG. 6.

The sub-sea check valve shown in FIG. 5 and 7 is similar in many respects to the check valve shown in FIGS. 1 to 4. Features of the two valves which are similar are identified by the same reference characters. The following description of the sub-sea check valve shown in FIGS. 6 and 7 is directed towards the features by which that valve differs from the check valve shown in FIGS. 1 to 4.

Rather than being seated in a shoulder which is formed in the valve body 10, the upper portion of the valve seat 14 is fixed to the valve body 10 by a stirrup clamp 14D which extends over the valve seat 14 and cooperates with suitable formations in the valve body 10. The downstream face of the stirrup clamp 14D is normal to the axis of the through bore 12 and, together with the exposed portion of the downstream face of the valve seat 14 serves as the crescent-shaped abutment surface 15 for the clapper disc portion 16A. The hinge pin 18 is fixed in the support 19, there being no handle 20. The support 19 is part of the bonnet 11 rather than the body 10. The lever 17 has a lug formed on its face remote from the clapper 16. A two-link toggle linkage 25 has one end pinned to the lug and its other end pinned to the lower end of a vertically extending ramrod 26 of a fluid pressure operable actuator 27. The cylinder body 28 of the actuator 27 is mounted releasably on the top of the bonnet 11. The ramrod 26 extends in a fluid tight manner through a vertical bore in the bonnet 11, there being suitable sleeve bearings and seals mounted in the vertical bore and cooperating with the ramrod 26.

An abutment 31 depends from the bonnet 11 adjacent the downstream end of the aperture 13 and serves as a stop for the clapper 16, being spaced from the hinge pin 18 sufficiently for the lug and the toggle linkage 25 to pass it without touching.

The clapper 16 is formed with a profiled portion 16C which projects through the annular valve seat 14 when the clapper is seated. The end of the profiled portion 16C is formed as an arcuate groove 16D which has substantially the same radius of curvature as the through bore 12 so that, when the clapper 16 is in contact with the abutment 31 at the upper end of its range of arcuate movement (as shown in FIG. 7). The arcuate surface of the groove 16D is a substantial continuation of the wall of the through bore 12.

The interior of the cylinder body 28 is divided into an upper cylinder space 33 and an annular cylinder space by a piston head 35 at the upper end of the ramrod 26. The annular cylinder space is not shown in FIGS. 6 and 7 because of the state of the valve. There is a compression spring 36 which reacts on the upper end wall of the cylinder body 28 and urges the ramrod 26 downwards.

The actuator 27 is controlled from a remote location, say at the surface, by a hydraulic control system which is not shown. A torsion spring 37 is anchored relative to the bonner 11 at one end, is passed around the hinge pin 18 and along the length of the lever 17, and acts to counter balance the weight of the clapper 16.

By buckling, the toggle linkage 25 allows the obturating member, comprising the clapper 15 and the lever 17, to pivot freely relative to the rest of the structure when the ramrod 26 is held by the action of the spring 36 of the actuator 27 in the lower position shown in full lines in FIGS. 6 and 7, the spring 36 over-coming the effect of fluid pressure in the alcove on the lower end of the ramrod 26. Hence the clapper 16 floats in the fluid and thus is displaced from the annular valve seat.

In order to clear the through bore 12 for the passage therethrough of a pig for any one of the number of possible functional operations to be performed by such a pig, the actuator 27 is actuated by operation of the control system to connect the annular cylinder space below the piston head 35 to a source of hydraulic pressure so that the ramrod 26 is driven upwards carrying the upper end of the toggle linkage 25 with it to the position shown chain-dotted in FIG. 7, the toggle linkage 5, being extended, acts as a tie to lift the clapper 15 into contact with the abutment 31 and hold it there. The through bore 12 is then clear for the pasage of a pig. Only a small amount of fluid pressure is needed in the annular space 34 as the forces are substantially balanced.

When the obturating member is to be released, say when the operation to be performed by the pig has been completed, hydraulic fluid pressure is drained from the annular cylinder space and the piston head 35 and ramrod 26 are lowered by expansion of the spring 36. The obturating member is thus freed for further normal action.

The fact that the obturating member is suspended from the bonnet 11 which is secured releasably to the valve body 10 facilitates maintenance. The annular valve seat 14 can be removed and replaced through the aperture when the bonnet 11 has been removed. The actuator can be removed from the bonnet 11 independently for maintenance.

The check valve can be used to control normal flow in the direction opposite to that indicated by arrow B, but it would be necessary for the clapper is to be held displaced from the valve seat 14 by the actuator 27 for such flow to commence. The actuator 27 would be operated to lower the ramrod 26 when such flow is to be checked, the flow then causing the clapper 16 to seat automatically.

We claim:

1. A check valve comprising a housing which forms a through passage which is to be connected into a fluid pipeline when the valve is in use, the housing including an annular valve seat which extends around the passage and tapers towards the upstream end of the passage in the context of the normal direction of flow through the passage, and an obturating member cooperable with the valve seat to close the through passage and displacable from the valve seat' to allow fluid flow through the through passage, the obturating member carrying an annular seal which effects a seal between the obturating member and the valve seat when the through passage is closed by the obturating member, wherein the annular seal comprises a floating ring seal, and an abutment surface extends around at least part of the passage downstream of the valve seat, the obturating member being adapted to make direct face-to-face contact with the abutment surface when it closes the through passage and being formed to provide for access to the annular seal for reverse fluid flow when the passage is closed by the obturating member, the obturating member, abutment surface, valve seat and annular seal being arranged such that the housing reacts a load exerted on it through and by the obturating member without that load being applied to the annular seal such that, once initial contact of the seal with the valve seat is established, fluid tight contact between the seal and the valve seat and the obturating member is established solely by the action of fluid pressure on the seal.

2. A check valve according to claim 1, wherein the obturating member is adapted to make contact with the abutment surface around part only of the passage, there being a clearance between the onturating member and wall of the passage whereby said access is provided.

3. A check valve according to claim 2 which is to be connected into a substantially horizontally extending fluid pipeline when the valve is in use, wherein the clearance is at the bottom.

4. A check valve according to claim 3, wherein structure of said obturating member which is adapted to contact said abutment surface comprises a disc portion which is eccentric to said valve seat when in contact with said abutment surface so that such contact extends over the top and sides of the valve seat but not at the bottom in a plane substantially normal to the axis of the through passage.

5. A check valve according to claim 1, wherein the abutment surface is substantially normal to the axis of the through passage.

6. A check valve according to claim 1, wherein the floating ring seal comprises an annular peripheral portion which forms a shallow concave radially outer peripheral sealing surface having a greater outside diameter at one end than at the other, the peripheral portion being formed at the radially outer edge of a radially convoluted annular portion, the ring seal being carried by the obturating member with said one end downstream of the other end, and being downstream from a reaction surface, which is formed in said obturating member, in the context of the normal direction of fluid flow through the passage, as the obturating member approaches the valve seat to close the through passage, the concave sealing surface being adapted to engage the tapered valve seat to effect said seal, the arrangement being such that the peripheral portion is urged into the taper by reverse fluid flow once the obturating member has seated and its travel into the taper is resisted by abutment with said reaction surface which in turn is held by the abutment of the obturating member with the abutment surface.

7. A check valve according to claim 6, wherein the radially inner periphery of the convoluted annular portion is formed as a thickened rib which is clamped within the obturating member.

8. A check valve according to claim 6, wherein a concentric ring of soft sealing material is provided at the centre of the concave radially outer peripheral surface of the outer portion.

* * * * *